United States Patent
Green et al.

(10) Patent No.: US 10,356,030 B2
(45) Date of Patent: *Jul. 16, 2019

(54) BATTERY EFFICIENT SYNCHRONIZATION OF COMMUNICATIONS USING A TOKEN BUCKET

(71) Applicant: Microsoft Technology Licensing, LLC, Redmond, WA (US)

(72) Inventors: Hagen Green, Kirkland, WA (US); Jon Morris, Renton, WA (US); Anish Desai, Bellevue, WA (US); Marc McClure, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

This patent is subject to a terminal disclaimer.

(21) Appl. No.: 15/273,123

(22) Filed: Sep. 22, 2016

(65) Prior Publication Data

US 2017/0012918 A1 Jan. 12, 2017

Related U.S. Application Data

(63) Continuation of application No. 14/252,699, filed on Apr. 14, 2014, now Pat. No. 9,479,610.

(51) Int. Cl.
*H04L 12/58* (2006.01)
*H04L 29/08* (2006.01)
(Continued)

(52) U.S. Cl.
CPC .............. *H04L 51/22* (2013.01); *G06F 1/329* (2013.01); *G06F 1/3234* (2013.01);
(Continued)

(58) Field of Classification Search
CPC ....... H04L 51/22; H04L 47/216; H04L 51/26; H04L 57/26; H04L 67/325; G96F 1/3234;
(Continued)

(56) References Cited

U.S. PATENT DOCUMENTS 6,236,971 B1 * 5/2001 Stefik ...................... G06F 21/10
705/54
6,920,436 B2 * 7/2005 Stefik ...................... G06F 21/10
375/E7.009

(Continued)

FOREIGN PATENT DOCUMENTS

CN 101658004 A 2/2010
CN 102075451 A 5/2011
CN 102118314 A 7/2011

OTHER PUBLICATIONS

"GitHub—bbeck/token-bucket", Retrieved From https://github.com/bbeck/token-bucket/tree/f1d677c3bbd3fde4a7f80d68f16ca8e8299bb12d, Retrieved on Mar. 14, 2018, 2 Pages.

(Continued)

*Primary Examiner* — Uzma Alam
(74) *Attorney, Agent, or Firm* — Klarquist Sparkman, LLP

(57) ABSTRACT

Systems and methods for email synchronization may include a computing device with a token bucket. The token bucket allows for temporary storage of tokens, each token authorizing a synchronization of at least one email application running on the computing device. The device may determine a frequency of received email communications associated with an email account managed by the at least one email application and hosted by an email server. The determining may be based on one or more characteristics associated with the token bucket. The determined frequency may be compared with a threshold value. When the determined frequency is equal to or lower than the threshold value, a push communication channel may be established with the email server, the push communication channel for receiving server-initiated email push communications. The at least one email application may be synchronized with the email account by receiving push communications using the push communication channel.

17 Claims, 11 Drawing Sheets

(51) Int. Cl.
*H04L 12/819* (2013.01)
*G06Q 10/10* (2012.01)
*G06F 1/3234* (2019.01)
*G06F 1/329* (2019.01)

(52) U.S. Cl.
CPC ......... *G06Q 10/107* (2013.01); *H04L 47/215* (2013.01); *H04L 51/26* (2013.01); *H04L 67/26* (2013.01); *H04L 67/325* (2013.01); *Y02D 10/24* (2018.01)

(58) Field of Classification Search
CPC ...... G96F 1/329; G06Q 10/107; Y02D 10/24; G06F 1/3234; G06F 1/329
See application file for complete search history.

(56) References Cited

U.S. PATENT DOCUMENTS

| | | | | |
|---|---|---|---|---|
| 7,657,628 | B1* | 2/2010 | McDysan | G06F 11/2028 370/401 |
| 7,710,975 | B2 | 5/2010 | Commarford et al. | |
| 8,019,370 | B2* | 9/2011 | Sengupta | G06F 1/3209 455/502 |
| 8,121,585 | B2* | 2/2012 | Commarford | H04L 67/1095 455/418 |
| 8,463,859 | B2* | 6/2013 | Provo | G06Q 10/10 709/206 |
| 9,143,564 | B2* | 9/2015 | Milburn | H04N 5/04 |
| 9,787,769 | B2* | 10/2017 | Kumar | H04L 51/22 |
| 2012/0221651 | A1* | 8/2012 | Rabii | H04L 51/38 709/206 |
| 2013/0205001 | A1* | 8/2013 | Reed | G06F 9/4418 709/224 |
| 2013/0223314 | A1* | 8/2013 | Chen | H04W 52/0209 370/311 |
| 2014/0019643 | A1* | 1/2014 | Raju | H04L 67/32 709/248 |
| 2014/0289428 | A1* | 9/2014 | Walter | H04L 51/22 709/248 |

OTHER PUBLICATIONS

"Python—What's a Good Rate Limiting Algorithm", Retrieved From https://web.archive.org/web/20140413185601/https://stackoverflow.com/questions/667508/whats-a-good-rate-limiting-algorithm, Apr. 13, 2014, 7 Pages.

"Office Action Issued in European Patent Application No. 15719914. 2", dated Mar. 27, 2018, 10 Pages.

"HTC SmartSync", Published on: Feb. 22, 2013, Available at: https://play.google.com/store/apps/details?id=com.gmail.detcup4evr. smartsync&hl=en.

"How to request, create, and save a notification channel (Windows Runtime apps using JavaScript and HTML)," first crawled by the Wayback Machine on Jan. 16, 2012, available at: <http://web.archive.org/web/20130112010337/http://msdn.microsoft.com/en-us/library/windows/apps/hh465412.aspx>, visited on Apr. 2, 2014 at <http://msdn.microsoft.com/en-us/library/windows/apps/hh465412.aspx>, 3 pages.

"Windows Push Notification Services (WNS) overview (Windows Runtime apps)," first crawled by the Wayback Machine on Apr. 10, 2012, available at: <http://web.archive.org/web/20130914060311/http://msdn.microsoft.com/en-us/library/windows/apps/hh913756.aspx?>, visited on Apr. 2, 2014 at <http://msdn.microsoft.com/en-us/library/windows/apps/hh913756.aspx>, 5 pages.

International Search Report and Written Opinion for International Application No. PCT/US2015/024416, 11 pages, dated Jul. 8, 2015.

Sillars, Doug, "Push or Poll? How Email Setup Can Save Your Battery Life", Dec. 11, 2012 (Dec. 11, 2012 ), XP055198473, Retrieved from the Internet: URL:http://networkingexchangeblog.att.com/enterprise-business/push-or-poll-how-email-setup-can-save-your-battery-life/#fbid=jFTnfH9HAG9 [retrieved on Jun. 25, 2015].

Wikipedia, "Python Task Queue Configuration—Google App Engine—Google Code", Feb. 14, 2010 (Feb. 14, 2010), XP055198931, Retrieved from the Internet: URL:https://web.archive.org/web/20100214121015/http:I/code.google.com/intl/en/appengine/docs/python/config/queue.html [retrieved on Jun. 29, 2015].

Wikipedia, "Token bucket—Wikipedia, the free encyclopedia", Apr. 8, 2014 (Apr. 8, 2014), XP055198922, Retrieved from the Internet: URL:https://en.wikipedia.org/w/index.php?title=Token_bucket&oldid=603375240. [retrieved on Jun. 29, 2015].

Second Written Opinion Issued in PCT Application No. PCT/US2015/024416, dated Nov. 10, 2015, 6 Pages.

International Preliminary Report on Patentability Issued in PCT Application No. PCT/US2015/024416, dated Feb. 5, 2016, 7 Pages.

Notice on the First Office Action, Chinese Patent Application No. 201580019923.4, 18 pages, dated Sep. 30, 2018.

Sillars, "Push or Poll? How Email Setup Can Save Your Battery Life," <https://www.business.att.com/learn/operational-effectiveness/push-or-poll--how-email-setup-can-save-your-battery-life.html>, 2 pages (accessed Oct. 25, 2018).

"Office Action Issued in Chinese Patent Application No. 201580019923. 4", dated Mar. 15, 2019, 7 Pages.

* cited by examiner

BATTERY EFFICIENT SYNCHRONIZATION OF COMMUNICATIONS USING A TOKEN BUCKET

RELATED APPLICATION DATA

This application is a continuation of U.S. patent application Ser. No. 14/252,699, filed Apr. 14, 2014, which is hereby incorporated by reference herein.

BACKGROUND

As computing technology has advanced, increasingly powerful mobile devices have become available. For example, smart phones have become commonplace. The mobility of such devices has resulted in different types of functionality being developed, such as email-related functionalities and battery-saving functionalities. Mobile device chipsets, including memory and displays, have all made significant improvements in efficiency over the past several years. Battery technology, however, has not kept up with the advancement of such mobile device components. With ever more powerful chipsets and larger screens, mobile devices' demand for energy continues to grow while battery capacity growth has been lagging behind.

Using email on a mobile device is now synonymous with using a smartphone. Users like to receive their emails on their mobile device as soon as the emails arrive on the server. Email-related functionalities are one of the major power drains on mobile device battery power. Over the life of a mobile device, synchronizing email is consistently the largest application-based background consumer of battery.

Emails can be received from the email server using push-type communication (the server pushes emails to the mobile device) and poll (or fetch)-type communication (the mobile device requests emails from the server). Each push or poll operation consumes energy from the device battery. A single push operation consumes about the same energy when pushing one or several emails. Similarly, a single poll operation consumes about the same energy when fetching one or several emails.

In a poll-type communication, the mobile device requests emails periodically from the server (e.g., every 5 minutes). In this regard, polling can be efficient in instances when the frequency of received emails is high (e.g., if the user receives 10 emails in 5 minutes, a single request to the server will fetch all 10 emails at the energy cost of receiving 1 email). However, polling drains energy from the device battery when the frequency of emails is low (e.g., if the user receives 10 emails a day, the mobile device will request for emails over 200 times a day but at most 10 requests will fetch emails, the remaining requests will fetch no emails).

In a push-type communication, the server pushes an email to the mobile device as soon as the email arrives on server. This type of communications may be efficient when the frequency of received emails is low (e.g. if 10 emails arrive at the email server, the mobile device will be notified only 10 times). Push-type communications, however, may be inefficient and drain more battery power in instances when the frequency of received emails is high (e.g., if the user receives 500 emails a day, the mobile device will be notified 500 times, using significant amount of battery power).

In this regard, device battery life may be negatively impacted under push or poll-type communications. There are many variables that determine the extent of the negative impact on the battery, which is directly proportional to the frequency of communication with the email server in addition to the amount of email the user receives. In this day and age of always up-to-date email, the negative impact email can have on the battery of a mobile device can be significant.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a method for email synchronization may include a computing device with a token bucket. The token bucket allows for temporary storage of tokens, each token authorizing a synchronization of at least one email application running on the computing device. The device may determine a frequency of received email communications associated with an email account managed by the at least one email application and hosted by an email server. The determining may be based on one or more characteristics associated with the token bucket. The determined frequency may be compared with a threshold value. When the determined frequency is equal to or lower than the threshold value, a push communication channel may be established with the email server, the push communication channel for receiving server-initiated email push communications. The at least one email application may be synchronized with the email account by receiving push email communications using the push communication channel. When the determined frequency is greater than the threshold value, the push communication channel may be closed. The at least one email application may then be synchronized with the email account using an email pull request initiated by the computing device. The frequency of received emails may be monitored automatically (e.g., by the device or the server) and switch between push and poll (or fetch) may be performed automatically, based on whether the frequency is below or above the threshold value.

In accordance with one or more aspects, a method for email synchronization may include a computing device with a token bucket. The token bucket may allow for temporary storage of tokens, each token authorizing a synchronization of at least one email application running on the computing device. The device may determine whether at least one of the tokens is available in the token bucket. When the at least one of the tokens is available in the token bucket, a request for synchronizing the at least one email application with a corresponding email account may be generated. In response to the request, one or more email communications from the corresponding email account may be received, for synchronizing the at least one email application. The request for synchronization may be associated with, for example, a scheduled email synchronization with an email server hosting the corresponding email account.

In accordance with one or more aspects, a computer-readable storage medium may have stored thereon computer-executable instructions operable to cause a computing device to perform a method for email synchronization. The method may include resetting at the computing device, a token bucket with an initial set of tokens. Each token may authorize a synchronization of at least one email application running on the computing device. The initial set of tokens may be determined based on one or more device use statistics associated with the computing device. In response to an email pull request initiated by the computing device, a current token count associated with the token bucket may be verified that it is positive (i.e., the token bucket is not empty). When the current token count is positive, at least one email application running on the computing device may be synchronized with an email account hosted at an email server. The current token count may then be reduced based on the synchronizing.

In accordance with one or more aspects, a computing device may include a processor, a memory, and a synchronization service with a token bucket. The token bucket may allow for temporary storage of tokens, each token authorizing a synchronization of at least one email application running on the computing device. The synchronization service may be configured to perform operations for email synchronization, including resetting the token bucket with an initial set of tokens. Each token may authorize a synchronization of the at least one email application running on the computing device with a corresponding email account hosted by an email server. A push communication channel may be established with the email server. The push communication channel may be used for receiving server-initiated email push communications (e.g., in instances when the token bucket is not empty). The synchronization service may determine whether at least one of the tokens is available in the token bucket. If at least one of the tokens is not available in the token bucket, the push communication channel may be closed (and may be subsequently re-opened when there is at least one token available in the token bucket).

As described herein, a variety of other features and advantages can be incorporated into the technologies as desired.

DETAILED DESCRIPTION

Figure 1:
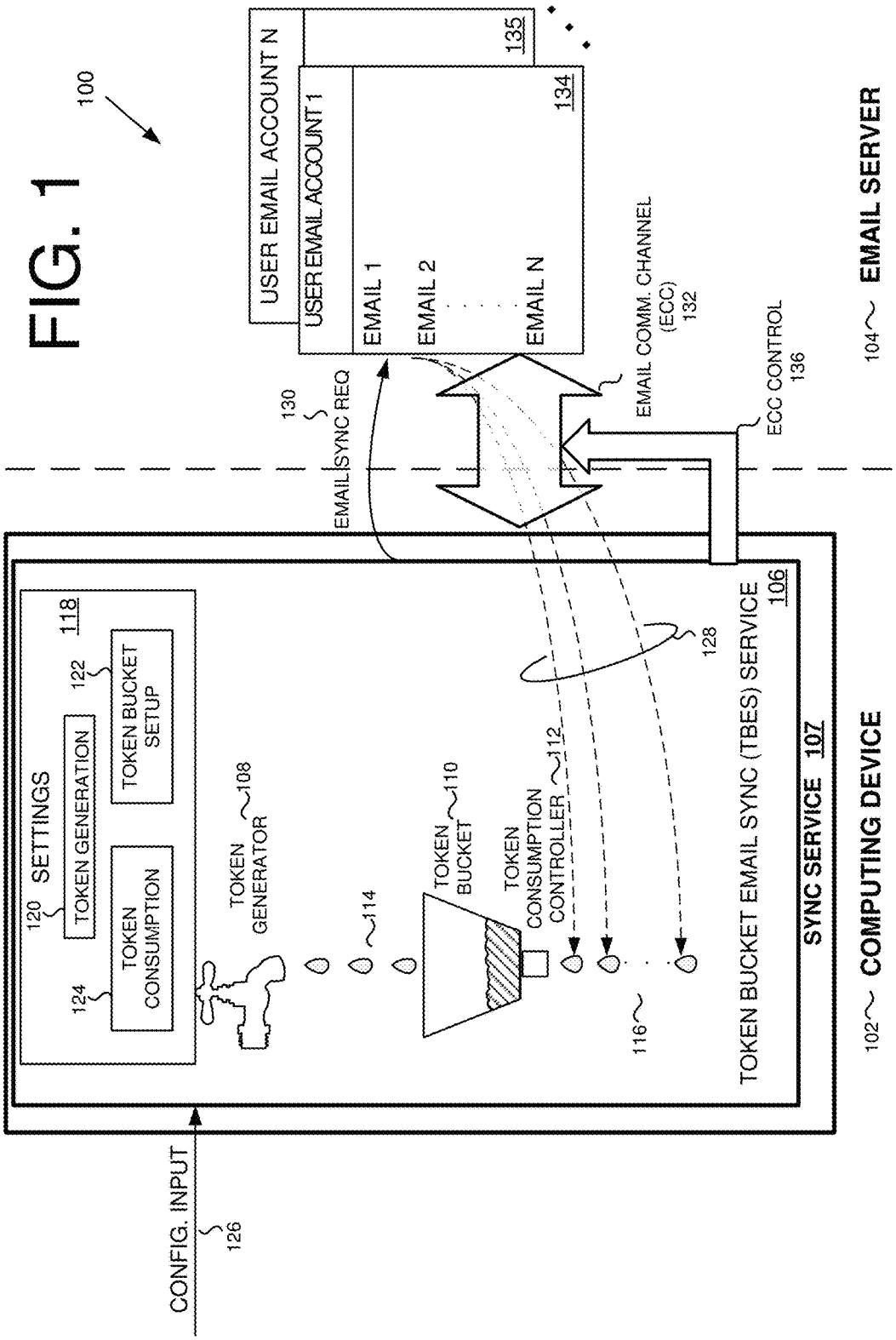
FIG. 1 illustrates an example system in which email synchronization using a token bucket can be implemented, in accordance with an example embodiment of the disclosure.

Always up-to-date email relies on the email servers to notify the mobile device when there is a new message (e.g., server-initiated push communications). In this type of architecture, the mobile device is in a constant "listening" state (e.g., waiting for the next notification), and every incoming notification causes the device radio to wake up. In this regard, a mobile device can quickly degenerate from having several days of battery life to a couple of hours of battery life by getting inundated (e.g., a couple times per minute for the course of several hours) with new mail notifications resulting from the user's standard email communications or based on communications with malicious intent (e.g., hacked email account).

The problem of power consumption on mobile devices due to frequently updated email has not yet been successfully solved without active user intervention. One solution is to provide user-selectable settings so that the user can select the appropriate synchronization parameters, the parameter that has the biggest impact on energy usage over time being the frequency of synchronization. This setting, however, is insufficient for most users because it is usually not optimal across a person's email usage during a work day, evening, overnight, and weekend, for example. Most users infrequently update synchronization settings as it may become difficult to determine the proper setting for their individual needs.

As described herein, various techniques and solutions can be applied for battery efficient synchronization of communications using a token bucket, which improve the drawbacks of conventional synchronization (e.g., email synchronization). More specifically, token bucket based throttling of email synchronization may be performed, thereby optimizing one of the most energy demanding device application (i.e., email synchronization) with the most limited resource (i.e., battery power), while offering a user-friendly experience to control and manage email synchronization. In an example embodiment, frequency of email communications may be determined using a token bucket (i.e., a token bucket algorithm) Email synchronization may be performed by automatically switching between push- and poll-type synchronization. For example, push-type synchronization may be used when email frequency (i.e., frequency of received emails for a user email account) is low (e.g., below a pre-determined threshold frequency value), and poll-type communications may be used when the email frequency is above the threshold frequency value. The threshold frequency value at which the mobile device switches between push and poll may be determined based on one or more parameters associated with the token bucket algorithm.

A computing device email synchronization service may use a token bucket algorithm to limit "peak usage" of push-style email notifications and/or device-initiated fetch-style notifications. A single token may be deposited per every unit time T, and a token may be used for each email synchronization (fetch and/or push type email communications), with each sync including multiple sent and/or received emails. This approach effectively allows an email-based account to synchronize a specified number of times per time period. Unused tokens may be collected and saved for use at a later time, with the maximum number of tokens that can be collected depends on the token bucket "size". Tokens may be recycled so collection is not unbounded (e.g., the entire token bucket may be reset and re-initialized with initial settings every 24 hours). If tokens are exhausted due to too many email notifications over a short period of time, email synchronization may be suspended until a token is made available at the next unit time T. For example, when token count drops to zero, email synchronization may be switched from using a push-based approach to using a poll-based approach. When token count goes to non-zero, email synchronization may be switched back from using a poll-based approach to a push-based approach.

The token bucket may also allow "free syncs" where a device user can synchronize their email without incurring the cost of a token. For example, such "free sync" may be allowed when the device screen is turned ON and the user is actively using the device for data (i.e., the device radios are not in low power mode).

Even though techniques described herein are using email synchronization, the disclosure may not be limited in this regard and other types of Personal Information Management (PIM) data may also be synchronized using such techniques. For example, other PIM data such as calendar entries, one or more contact entries from contact managers, web browsers bookmarks, notes, one or more messages from a messaging application, and so forth, may also be synchronized using a token bucket as described herein.

As used herein, the term "token bucket" refers to a token bucket algorithm, which can be implemented as part of a device operating system or coded as part of a dedicated module. The settings and use of the token bucket algorithm as applied to email synchronization are discussed herein below.

As used herein, the terms "client-initiated pull," "device-initiated pull," "email poll," or "device-initiated poll" refer to email synchronization using fetch-type communication. For example, a computing device (or another email client) initiates the "pull" of email communications hosted by an email server. Put another way, the computing device (e.g., via an email application running on the computing device) initiates email synchronization and "fetches" emails associated with an email account hosted at an email server.

As used herein, the terms "server-initiated push" or "email push" refer to email synchronization using push-type communications. For example, an email communication channel may be established (and controlled) by the computing device, communicatively coupling the computing device with an email server. The channel may be kept active by the device, and the server may initiate email synchronization by pushing email communications received at the user account hosted by the server, as such email communications arrive at the server.

As used herein, the term "sync" is synonymous with "synchronization" and refers to email synchronization. As used herein, the term "app" is synonymous with an "application" and refers to one or more applications installed at (and running on) a computing device.

FIG. 1 illustrates an example system in which email synchronization using a token bucket can be implemented, in accordance with an example embodiment of the disclosure. Referring to FIG. 1, the system 100 may comprise a computing device 102 and an email server 104. The computing device 102 can be any of a variety of computing devices, mobile or otherwise, including a cell phone, smartphone, handheld computer, Personal Digital Assistant (PDA), a tablet device, a desktop computer, a laptop or notebook, etc. The server 104 may be any of a variety of server computers, including a dedicated email server computer communicatively coupled to the computing device 102. Even though FIG. 1 illustrates only several components for the computing device 102 and the email server 104, other components may also be implemented as illustrated, for example, in FIG. 5.

The computing device 102 may comprise a synchronization service 107, which may be part of the operating system of device 102 or part of one or more applications (or apps) running on device 102. The synchronization service 107 may comprise suitable logic, circuitry, interfaces, and/or code and may be operable to perform email synchronization in connection with one or more user email accounts 134, . . . , 135 associated with a user of the device 102 and hosted by, e.g., the email server 104. The sync service 107 may also comprise a token bucket email synchronization (TBES) service 106, which may be used in connection with, for example, client-initiated pull and/or server-initiated push type of email synchronization.

The TBES service 106 may comprise suitable logic, circuitry, interfaces, and/or code and may be operable to implement a token bucket algorithm in connection with the client-initiated pull and/or the server-initiated push type of email synchronization. More specifically, the TBES service 106 may comprise a settings module 118, a token generator 108, a token bucket 110, and a token consumption controller 112. The settings module 118 may comprise various type of settings associated with the TBES service 106, such as token bucket setup settings 122, settings 120 related to token generation, and settings 124 related to token consumption. The settings 120-124 may be configured using configuration input 126, as discussed in greater detail below in reference to FIG. 2.

The token generator 108 may comprise suitable logic, circuitry, interfaces, and/or code and may be operable to generate one or more tokens 114 for storage in the token bucket 110. For example, the token generator may generate the token bucket 110 with a given size, and may generate and deposit a new token (e.g., 114) periodically, at a determined time period (e.g., based on token bucket setup settings 122).

The token consumption controller 112 may comprise suitable logic, circuitry, interfaces, and/or code and may be operable to control token consumption of tokens stored in the token bucket 110, as email synchronizations 128 take place. For example, as tokens 116 are consumed (e.g., each of the consumed tokens is associated with a corresponding one of the email synchronizations 128 for any one or more of the emails 1, N in one or more of the user email accounts 134, . . . , 135), the token consumption controller 112 may deduct the number of consumed tokens from the total number of tokens stored in the token bucket 110. In this regard, the token consumption controller 112 may store the current token count of tokens available in the token bucket 110. Additionally, the token consumption controller 112 may suspend or resume email synchronization based on the current count of available tokens in the token bucket 110. The generation and consumption of tokens associated with the token bucket 110 may be further dependent on token generation settings 120 and token consumption settings 124.

In an example client-initiated pull operation, the TBES service 106 may verify that there is at least one token in the token bucket 110 (i.e., the current token count in the token bucket 110 is positive), and may periodically generate an email synchronization request 130 after confirming there is at least one available token in the token bucket 110. The email synchronizations 128 may then take place by receiving one or more email communications (e.g., one or more of the emails in user email account 134), which consumes one or more of the tokens 116 from the token bucket 110. For example, emails 1 and 2 in user account 134 may be new emails (e.g., arriving after a previous client-initiated pull). After the next email synchronization request 130 is received by the email server 104, email synchronization 128 of emails 1 and 2 may take place, consuming one of the tokens 116 (i.e., one token is consumed per email synchronization with one or more email accounts 134, ..., 135 hosted by the email server 104).

In an example server-initiated push operation, the TBES service 106 (or the sync service 107) may generate an email communication channel (ECC) 132, which may be used for communication of emails during server-initiated push (and/or client-initiated pull) type email synchronization. The TBES service 106 (or another service within the device 102) may control (e.g., close/suspend or open/re-establish) the ECC 132 using the ECC control signal 136. For example, the TBES service 106 (e.g., the token consumption controller 112) may detect that the token bucket 110 is empty, and may generate the ECC control signal 136 to close or suspend the ECC channel 132. In this regard, any server-initiated push communications will also be suspended as the ECC channel will not be available. After the token generator 108 generates one or more new tokens 114, which are deposited into the token bucket 110, the token consumption controller may detect that the current token count is positive (i.e., there is at least one available token) and may generate a new ECC control signal 136 for opening or re-establishing of the ECC channel 132.

In accordance with an example embodiment of the disclosure, the token count in the token bucket 110 may be used to determine whether server-initiated push or device-initiated pull may be used for email synchronization. For example, if the token bucket 110 is empty (i.e., the token count in the bucket is 0), no push or pull communications may be allowed. When the token count increases (e.g., becomes 1), pull may be disabled and server-initiated push may be enabled. The server-initiated push may be disabled when the token bucket 110 becomes empty again.

Figure 2:
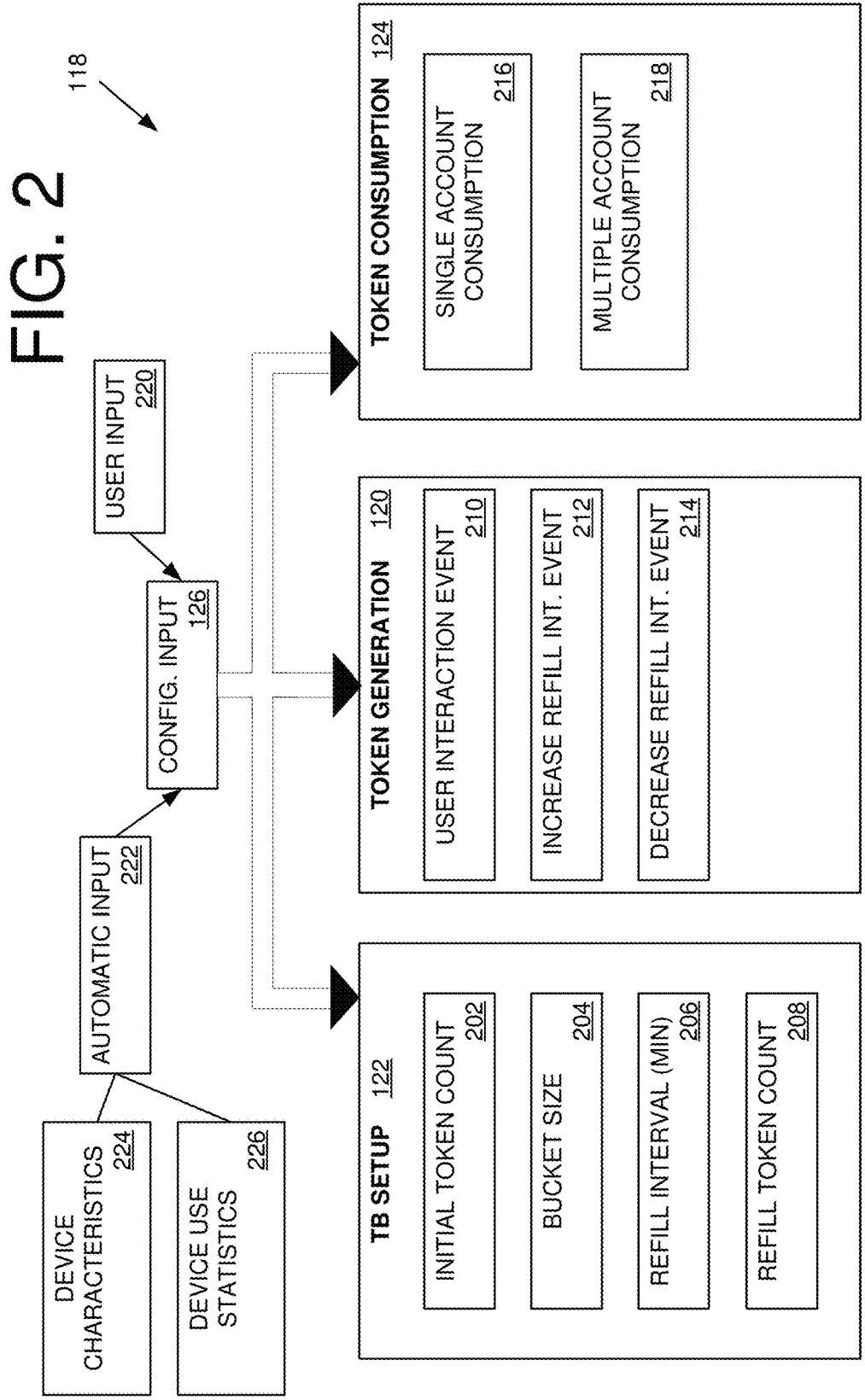
FIG. 2 is a block diagram of a token bucket settings module, which can be used with a token bucket based email synchronization, in accordance with an example embodiment of the disclosure.

FIG. 2 is a block diagram of a token bucket settings module, which can be used with a token bucket based email synchronization, in accordance with an example embodiment of the disclosure. Referring to FIGS. 1-2, the settings module 118 may comprise various type of settings associated with the TBES service 106, such as token bucket setup settings 122, settings 120 related to token generation, and settings 124 related to token consumption.

The token bucket setup settings 122 may comprise an initial token count 202, a bucket size 204, a refill interval period (e.g., in minutes) 206, and a refill token count 208. The setting values 202-208 may all be integer values and may be designated as, for example, InitialTokenCount, BucketSize, RefillIntervalInMinutes, and RefillTokenCount, respectively. The initial token count 202 indicates an initial number of tokens deposited at the time of initialization/resetting of the token bucket 204. The bucket size 204 may indicate a maximum number of tokens the token bucket 110 can hold. The refill interval period (e.g., in minutes) 206 indicates the refill time period used for periodic generation of new token (or tokens). The refill token count 208 indicates the number of tokens generated at each refill period.

The token generation settings 120 may specify one or more settings (or events) associated with the generating of tokens 114 by the token generator 108. For example, the token generation settings 120 may comprise a user interaction event 210, an increase refill interval event 212, and a decrease refill interval event 214. The user interaction event 210 may specify one or more user interaction events (e.g., a user turns ON device 102, which also activates the device screen). A detection of a user interaction event 210 by the token generator 108 may result in the issuance/generating of a "free token" (i.e., the generation of the free token takes place outside of the regular/periodic refill interval).

The increase refill interval event 212 may specify one or more events, which may cause an increase in the refill interval 206. For example, such events may include operating the device 102 in off-peak hours. The decrease refill interval event 214 may specify one or more events, which may cause a decrease in the refill interval 206. For example, such events may include using the device 102 when the device is charging. Additionally, the refill interval 206 may be varied based on remaining battery power or battery discharge rate, cellular signal strength, or device use patterns (which may be available as part of the device use statistics 226) that trend toward a more or less rapid battery discharge cycle relative to the battery discharge cycle associated with average use of the device 102. Accordingly, such events used for increasing or decreasing the refill interval 206 may be included (e.g., automatically via automatic input 222 or based on user input 220) in the events 212 or 214, respectively, using the device use statistics 226.

The token consumption settings 124 may specify one or more settings (or events) associated with the consumption of tokens from the token bucket 110. For example, the single account consumption settings 216 may specify which email account (e.g., selected from email accounts 134, ..., 135) is associated with token bucket 110. The single account consumption settings 216 may also specify how many tokens are consumed for each synchronization. The multiple account consumption settings 218 may specify a plurality of email accounts (e.g., selected from email accounts 134, ..., 135) are associated with token bucket 110. In this regard, one token bucket (e.g., 110) may be used for each user email account (134, ..., 135), or one token bucket may be shared among a plurality of user email accounts.

If multiple buckets are used for a plurality of email accounts, then the token count for each bucket may be stored (e.g., at the email server 104 as part of a user email profile or in device on-chip memory) if the user device has to be rebooted. Additionally, a user may be allowed to "borrow" tokens from one bucket so that email synchronization may take place using another token bucket that is currently empty. Such sharing (or "borrowing") of tokens may take place automatically or upon designation by the user (e.g., via user input 220)

The configuration input 126 may be used to configure/specify one or more of the token bucket setup settings 122, the settings 120 related to token generation, and the settings 124 related to token consumption. In an example embodiment, the configuration input 126 may be provided by user input 220. For example, one or more user interfaces may be provided by the computing device 102, enabling a user of the device to enter the configuration input 126. In another example embodiment, the configuration input 126 may be provided automatically, e.g., by automatic input 222. The automatic input 222 may be based, for example, on device characteristics 224 (e.g., remaining battery capacity, total battery capacity, battery discharge rate, percent of battery capacity/life remaining, current geo-location of the device, and so forth) or device use statistics 226 (e.g., user interaction frequency, total amount of emails received for a given time of day or day of the week, number of times in a given time period the device screen is turned ON, and so forth).

Figure 3:
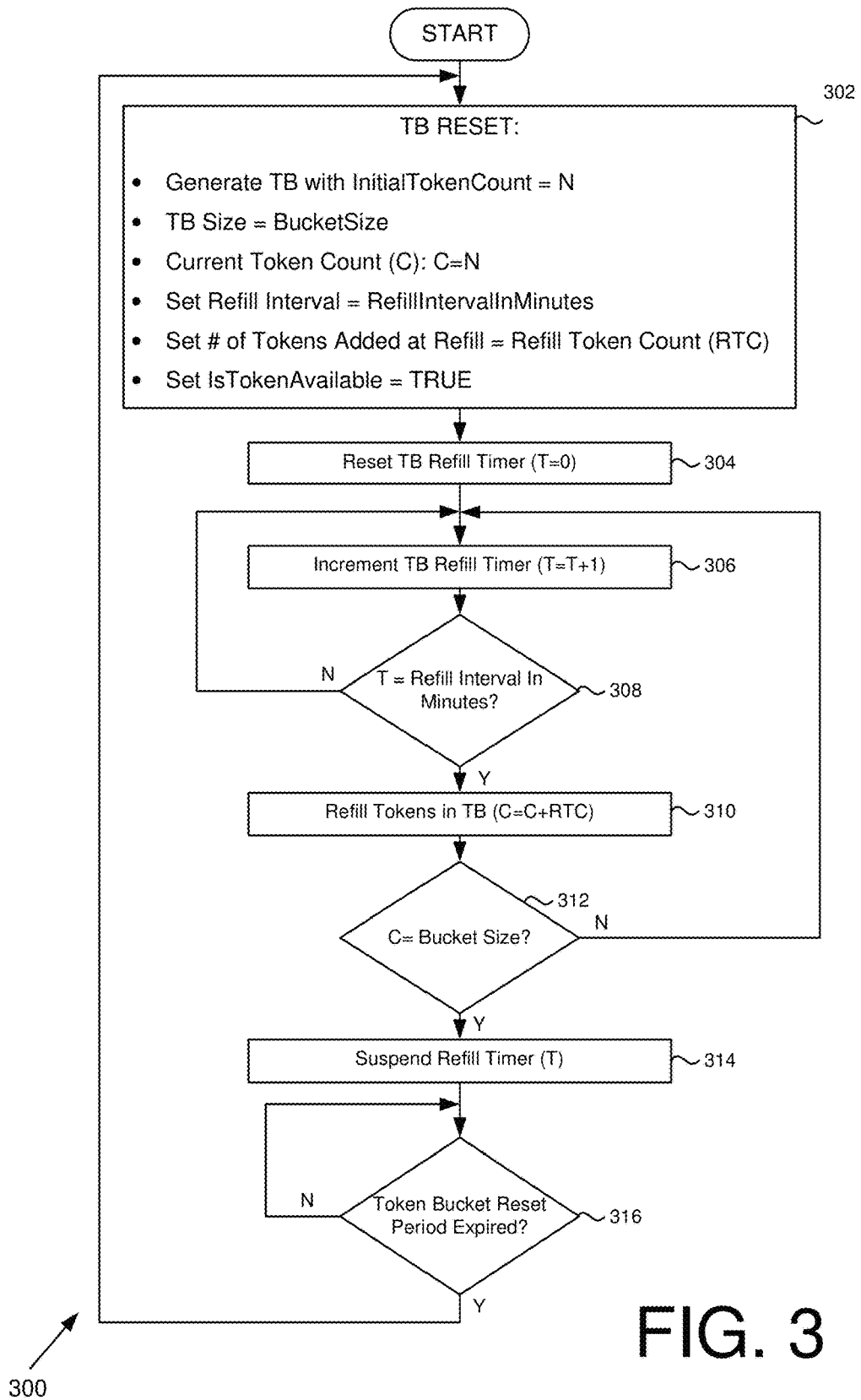
FIG. 3 is a flow diagram illustrating an example token bucket setup process, in accordance with an example embodiment of the disclosure.

FIG. 3 is a flow diagram illustrating an example token bucket setup process, in accordance with an example embodiment of the disclosure. Referring to FIGS. 1-3, the example process 300 may start at 302, when the token bucket (e.g., 110) may be reset. During the reset 302, the TBES service 106 may generate the token bucket 110 with an InitialTokenCount equal to N (where N is an integer greater than 0), a bucket size equal to BucketSize (an integer greater than 0), the token refill interval equal to RefillIntervalInMinutes, and the number of tokens added at each refill interval to RefillTokenCount (an integer greater than 0). Additionally, a current token count (C) may be set to N (the initial token count), and a Boolean value IsTokenAvailable may be set to TRUE (i.e., indicating that a token is available in the token bucket 110).

At 304, the TBES service 106 may reset a token bucket refill timer (T) by setting T=0. At 306, after a minute has elapsed, the token bucket refill timer may be incremented (i.e., T=T+1). At 308 it may be determined whether the token bucket refill timer T is equal to the RefillIntervalInMinutes. If the token bucket refill timer T is not equal to the RefillIntervalInMinutes, processing may resume at 306. If the token bucket refill timer T is equal to the RefillIntervalInMinutes, processing may continue at 310, when the token bucket 110 may be refilled with RefillTokenCount number of tokens (C=C+RefillTokenCount).

At 312, it may be determined whether the current token count C is equal to BucketSize. If the current token count C is not equal to BucketSize, processing may resume at 306. If the current token count C is equal to BucketSize, processing may resume at 314 when the refill timer T may be suspended (as the token bucket 110 is full to its capacity/size). Such suspension of the refill timer may be temporary, and the refill timer may resume upon a consumption of a token from the token bucket. The token bucket 110 may also be associated with a reset period (e.g., 24 hours). After the reset period has expired, the tokens in the token bucket may be discarded and the token bucket 110 may be reset. At 316, it may be determined whether such token bucket reset period (e.g., 24 hours since the token bucket was created) has expired. Unless there is any email synchronization activity that consumes tokens, the token bucket 110 may remain inactive until the token bucket reset period has expired, at which point, processing may resume at 302.

Figure 4:
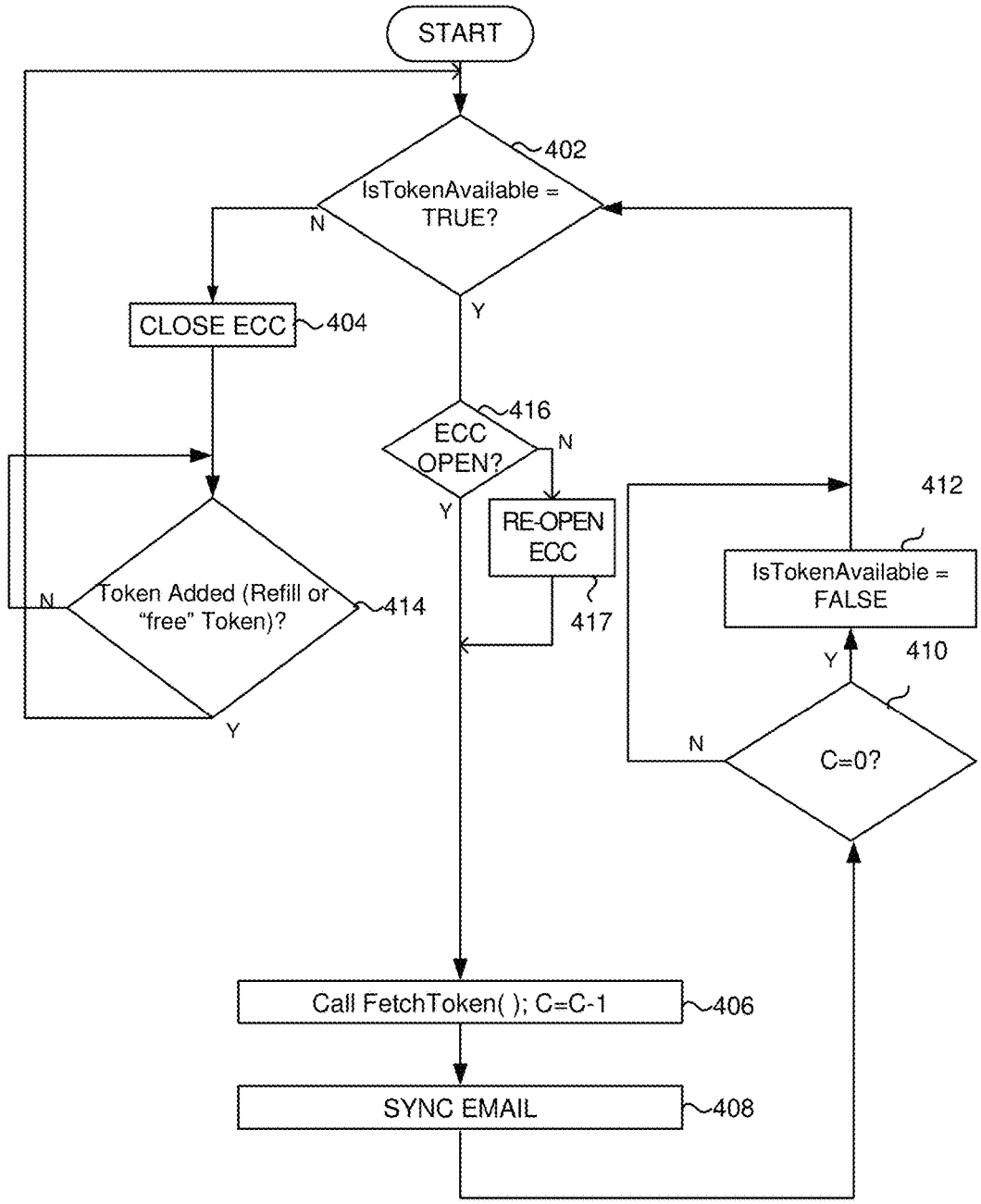
FIG. 4 is a flow diagram illustrating an example email synchronization process using a token bucket, in accordance with an example embodiment of the disclosure.

FIG. 4 is a flow diagram illustrating an example email synchronization process using a token bucket, in accordance with an example embodiment of the disclosure. Referring to FIGS. 1-2 and 4, the example process 400 may start at 402, when it may be determined whether the Boolean value IsTokenAvailable is TRUE (i.e., whether the token bucket 110 is not empty). If the token bucket 110 is not empty and IsTokenAvailable is TRUE, processing may continue at 416. If the token bucket 110 is empty (i.e., IsTokenAvailabe is FALSE), at 404, the ECC 132 may be closed/suspended. At 414, it may be determined whether a token has been added to the token bucket 110 (i.e., a "free" token or a token added during a regular refill interval). After a token has been added to the token bucket 110, processing may resume at step 402.

At 416, it may be determined if the communication channel (ECC) 132 is open. If the channel is not open, at 417, the ECC 132 may be re-opened. At 406, the token consumption controller 112 may fetch a token from the token bucket 110 for use during email synchronization (i.e., a function FetchToken) may be called and the current token count C may be reduced by 1). At 408, email synchronization may take place (e.g., server-initiated push or client-initiated pull email synchronization using the ECC 132). At 410, it may be determined whether the current token count C is equal to 0 (i.e., whether the token bucket 110 is empty). If the current token count is not 0, processing may resume at 402. If the current token count is equal to zero (i.e., the token bucket 110 is empty), then the Boolean value IsTokenAvailable may be set to FALSE and processing may continue at 402.

Figure 5:
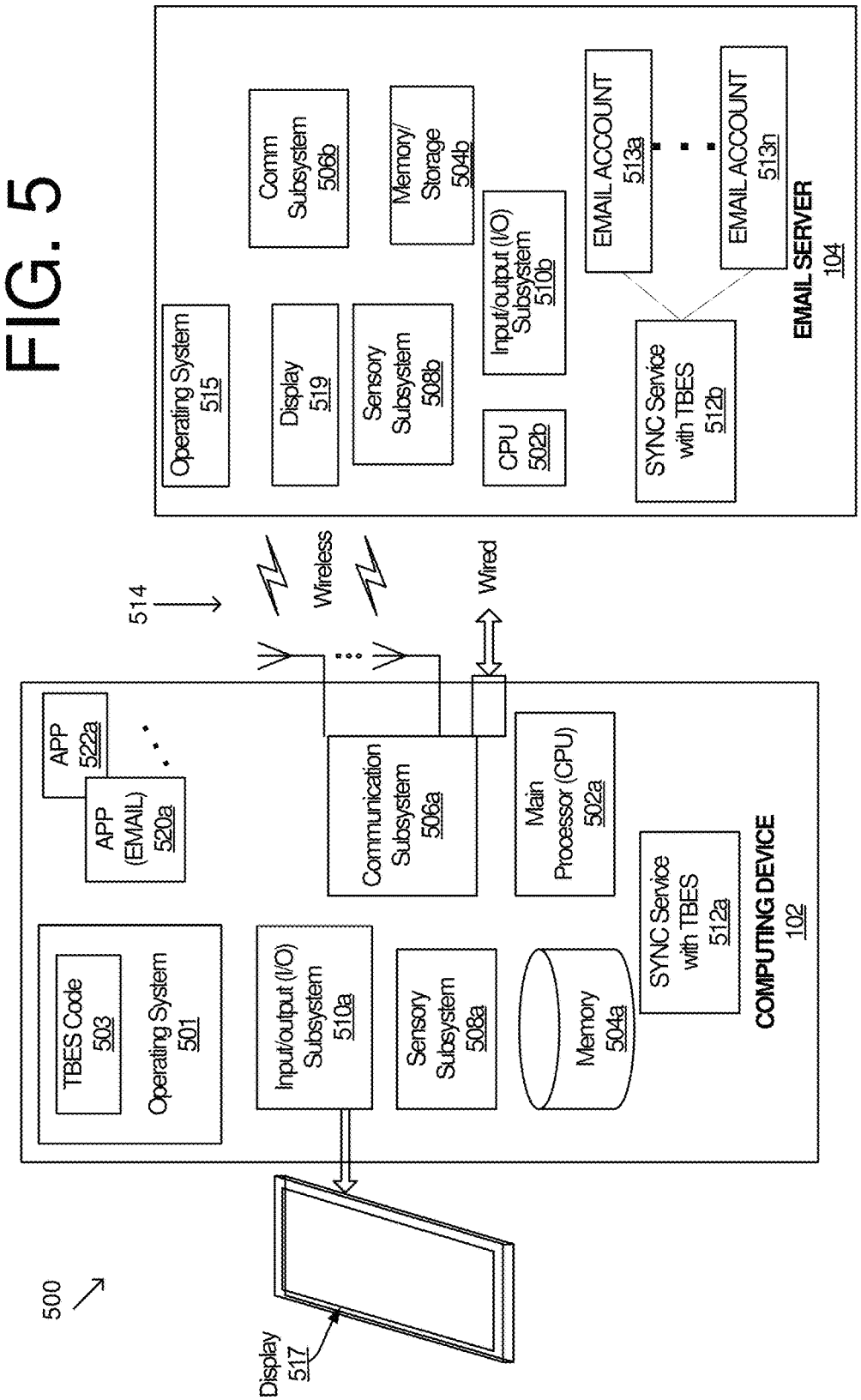
FIG. 5 is a block diagram of an example system with a computing device using an email synchronization service with a token bucket, in accordance with an example embodiment of the disclosure.

FIG. 5 is a block diagram of an example system with a computing device using an email synchronization service with a token bucket, in accordance with an example embodiment of the disclosure. Referring to FIG. 5, the example architecture 500 may comprise the computing device 102 and the email server 104.

The computing device 102 may include a handset, a smartphone, a tablet, a laptop, and/or another handheld or portable device. Additionally, the computing device 102 may comprise, for example, a main processor 502a, a system memory 504a, a communication subsystem 506a, a sensory subsystem 508a, an input/output (I/O) subsystem 510a, an operating system 501, one or more applications (or apps) 520a, . . . , 522a running on the device 102, a synchronization service 512a with TBES service, and display 517.

The synchronization service 512a, including the TBES service may have functionalities similar to the functionalities of the synchronization service 107 (with TBES service 106) described above. Additionally, the synchronization service 512a (including the TBES service) may be implemented as part of the operating system 501 (e.g., using the TBES code 503). An email application (e.g., 520a) may be used to implement an email client for purposes of performing the email synchronization functionalities disclosed herein.

The main processor 502a may comprise suitable logic, circuitry, interfaces, and/or code that may be operable to process data, and/or control and/or manage operations of the computing device 102, and/or tasks and/or applications performed therein in connection with the synchronization service 512a and the associated token bucket email synchronization functionalities described herein. In this regard, the main processor 502a may be operable to configure and/or control operations of various components and/or subsystems of the computing device 102, by utilizing, for example, one or more control signals. The main processor 502a enables running and/or execution of applications (e.g., 520a, . . . , 522a), programs and/or code, which may be stored, for example, in the system memory 504a. In some instances, one or more of the applications 520a, . . . , 522a running and/or executing on the computing device 102 may generate and/or update video content that may be rendered via the display 517. Alternatively, one or more dedicated application processors may be utilized for running and/or executing applications (or programs) (e.g., one or more of the applications 520a, . . . , 522a) in the computing device 102.

The system memory 504a may comprise suitable logic, circuitry, interfaces, and/or code that may enable permanent and/or non-permanent storage, buffering, and/or fetching of data, code and/or other information, which may be used, consumed, and/or processed. In this regard, the system memory 504a may comprise different memory technologies, including, for example, read-only memory (ROM), random access memory (RAM), Flash memory, solid-state drive (SSD), and/or field-programmable gate array (FPGA). The system memory 504a may store, for example, configuration data, which may comprise parameters and/or code, comprising software and/or firmware (e.g., the operating system 501 and/or one or more of the applications 520a, . . . , 522a.

The communication subsystem 506a may comprise suitable logic, circuitry, interfaces, and/or code operable to communicate data from and/or to the computing device 102, such as via one or more wired and/or wireless connections 514. The communication subsystem 506a may be configured to support one or more wired protocols (e.g., Ethernet standards, MOCA, etc.) and/or wireless protocols or interfaces (e.g., CDMA, WCDMA, TDMA, GSM, GPRS, UMTS, EDGE, EGPRS, OFDM, TD-SCDMA, HSDPA, LTE, WiMAX, WiFi, Bluetooth, and/or any other available wireless protocol/interface), facilitating transmission and/or reception of signals to and/or from the computing device 102, and/or processing of transmitted or received signals in accordance with applicable wired or wireless protocols. In this regard, signal processing operations may comprise filtering, amplification, analog-to-digital conversion and/or digital-to-analog conversion, up-conversion/down-conversion of baseband signals, encoding/decoding, encryption/decryption, and/or modulation/demodulation.

The sensory subsystem 508a may comprise suitable logic, circuitry, interfaces, and/or code for obtaining and/or generating sensory information, which may relate to the corresponding computing device 102, its user(s), and/or its environment. For example, the sensory subsystems 508a may comprise positional or locational sensors (e.g., GPS or other GNSS based sensors), ambient conditions (e.g., temperature, humidity, or light) sensors, and/or motion related sensors (e.g., accelerometer, gyroscope, pedometers, and/or altimeters).

The I/O subsystem 510a may comprise suitable logic, circuitry, interfaces, and/or code for enabling user interactions with the computing device 102, enabling obtaining input from user(s) and/or to providing output to the user(s). The I/O subsystems 510a may support various types of inputs and/or outputs, including, for example, video, audio, and/or textual. In this regard, dedicated I/O devices and/or components, external to or integrated within the computing device 102, may be utilized for inputting and/or outputting data during operations of the I/O subsystem 510a (e.g., for receiving user input 220). Exemplary I/O devices may comprise one or more built-in cameras (e.g., front-facing and/or rear-facing camera), one or more displays, mice, keyboards, touchscreens, voice input interfaces, and other input/output interfaces or devices. With respect to video outputs, the I/O subsystem 510a may each be operable to generate and/or process video content, graphics, and/or textual data, and/or generate video frames based thereon for display, via the display 517 for example.

The display 517 may comprise suitable logic, circuitry, interfaces and/or code that may enable displaying of video content, which may be handled and/or processed via the I/O subsystem 510a.

The email server 104 may also comprise a main processor 502b, a system memory 504b, a communication subsystem 506b, a sensory subsystem 508b, an input/output (I/O) subsystem 510b, and an operating system 515, which may have functionalities that are similar to the above-described functionalities of the corresponding modules in the computing device 102.

Even though the synchronization service with TBES functionalities is described as being implemented in a computing device (i.e., the email client), the disclosure may not be limited in this regard. In accordance with an example embodiment of the disclosure, the synchronization service with TBES functionalities may also be implemented (e.g., as 512b) as part of the email server 104. Additionally, the email server 104 may also implement one or more user email accounts 513a, . . . , 513n, which may be used for email synchronization in connection with the TBES functionalities described herein.

Figure 6A:
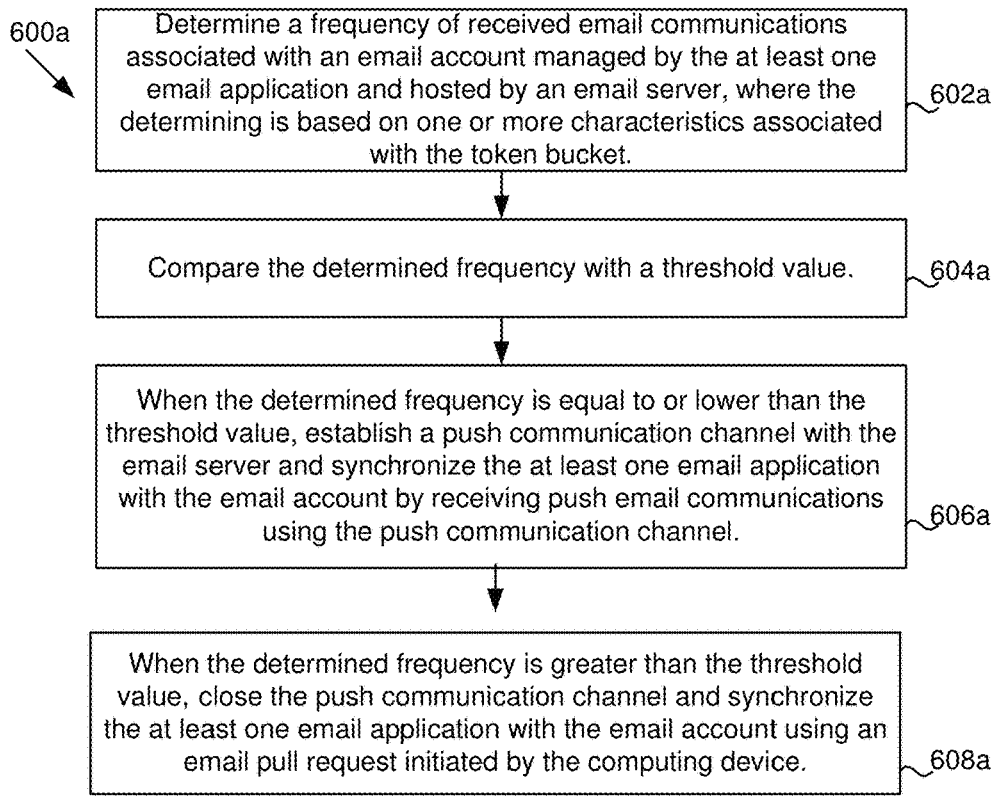
FIGS. 6A-6B are flow diagram illustrating example processes for email synchronization using a token bucket, in accordance with an example embodiment of the disclosure.
Figure 6B:
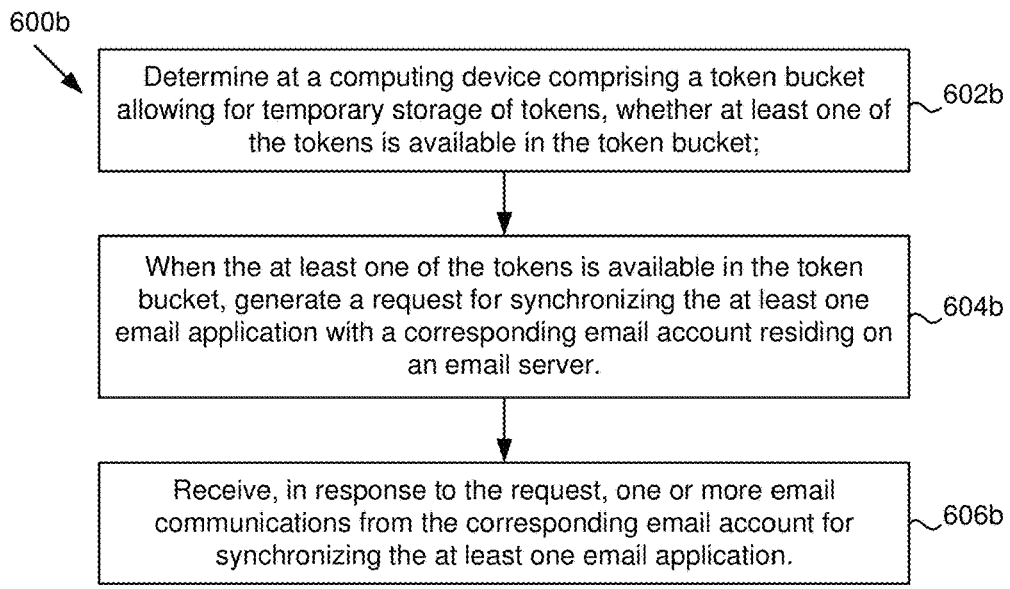

FIGS. 6A-6B are flow diagrams illustrating example processes for email synchronization using a token bucket, in accordance with an example embodiment of the disclosure.

Referring to FIGS. 1-2, 5 and 6A, the example method for email synchronization 600a may be performed by, for example, a computing device (e.g., 102) with a TBES service (e.g., 106) with a token bucket (e.g., 110). The token bucket 110 may allow for temporary storage of tokens (e.g., tokens 114 generated by token generator 108). Each token may authorize a synchronization of at least one email application (e.g., 520a) running on the computing device. The method 600a may start at 602a, when the computing device 102 (e.g., the synchronization service 107) may determine a frequency of received email communications associated with an email account (134, . . . , 135 or 513a, . . . , 513n) managed by the at least one email application (520a) and hosted by an email server (104). The determining may be based on one or more characteristics associated with the token bucket (e.g., 202-218). At 604a, the determined frequency may be compared with a threshold value. The threshold value may be set by a user/administrator of the device, or it may be set automatically (e.g., based on device use statistics).

At 606a, when the determined frequency is equal to or lower than the threshold value, a push communication channel (e.g., ECC 132) may be established with the email server (104), the push communication channel for receiving server-initiated email push communications. The at least one email application may then be synchronized with the email account by receiving push email communications using the established push communication channel. At 608a, when the determined frequency is greater than the threshold value, the push communication channel may be closed. The at least one email application may then be synchronized with the email account (134, . . . , 135 or 513a, . . . , 513n) using an email pull request initiated by the computing device (102).

Referring to FIGS. 1-2, 5 and 6B, the example method for email synchronization 600b may be performed by, for example, a computing device (e.g., 102) with a TBES service (e.g., 106) with a token bucket (e.g., 110). The token bucket 110 may allow for temporary storage of tokens (e.g., tokens 114 generated by token generator 108). Each token may authorize a synchronization of at least one email application (e.g., 520a) running on the computing device. The method 600b may start at 602b, when the computing device 102 (e.g., the synchronization service 107) may determine whether at least one of the tokens 114 is available in the token bucket 110. At 604b, if the at least one of the tokens is available in the token bucket 110, the token generator 108 (or the synchronization service 107) may generate a request for synchronizing (e.g., 130) the at least one email application 520a with a corresponding email account (e.g., 134).

At 606b, in response to the request, the TBES service 106 may receive one or more email communications (e.g., 128) from the corresponding email account (or may send out one or more outgoing email communications) for synchronizing the at least one email application 520a. The request for synchronizing 130 may be associated with a scheduled email synchronization with the email server 104 hosting the corresponding email account 134. The scheduled email synchronization may be based on an email pull request (e.g., 130) initiated by the computing device 102.

If the token bucket 110 is empty, generating the request for synchronizing 130 may be suspended. The token consumption controller 112 may detect if at least another one of the tokens is available in the token bucket 110. If the at least another one of the tokens is available in the token bucket 110, the periodic generation of the request for synchronizing (130) the at least one email application with the corresponding email account may be resumed.

The synchronization service 107 (or any other module within the device 102) may perform an initial setup of the token bucket 110 by selecting one or more of: an initial token count value (202), a token bucket size value (204), a token bucket refill interval value (206), and a refill token count value (208) associated with the token bucket. A number of tokens may be deposited periodically in the token bucket 110, at a time interval with duration equal to the token bucket refill interval value, and the deposited number of tokens equal to the refill token count value.

The synchronization service 107 may receive a user input (e.g., 220) selecting one or more of: the initial token count value, the token bucket size value, the token bucket refill interval value, and the refill token count value (as seen in FIG. 2). The initial setup (e.g. 122) of the token bucket 110 may be based on hardware characteristics (e.g., one or more of the device characteristics 224) of the computing device and/or use statistics (e.g., 226) associated with the computing device 102. The use statistics 224 may include at least one of frequency of user interaction with the computing device, a number of received emails during a time period, a number of times a screen of the computing device is turned on, and geo-location of the computing device.

Figure 7:
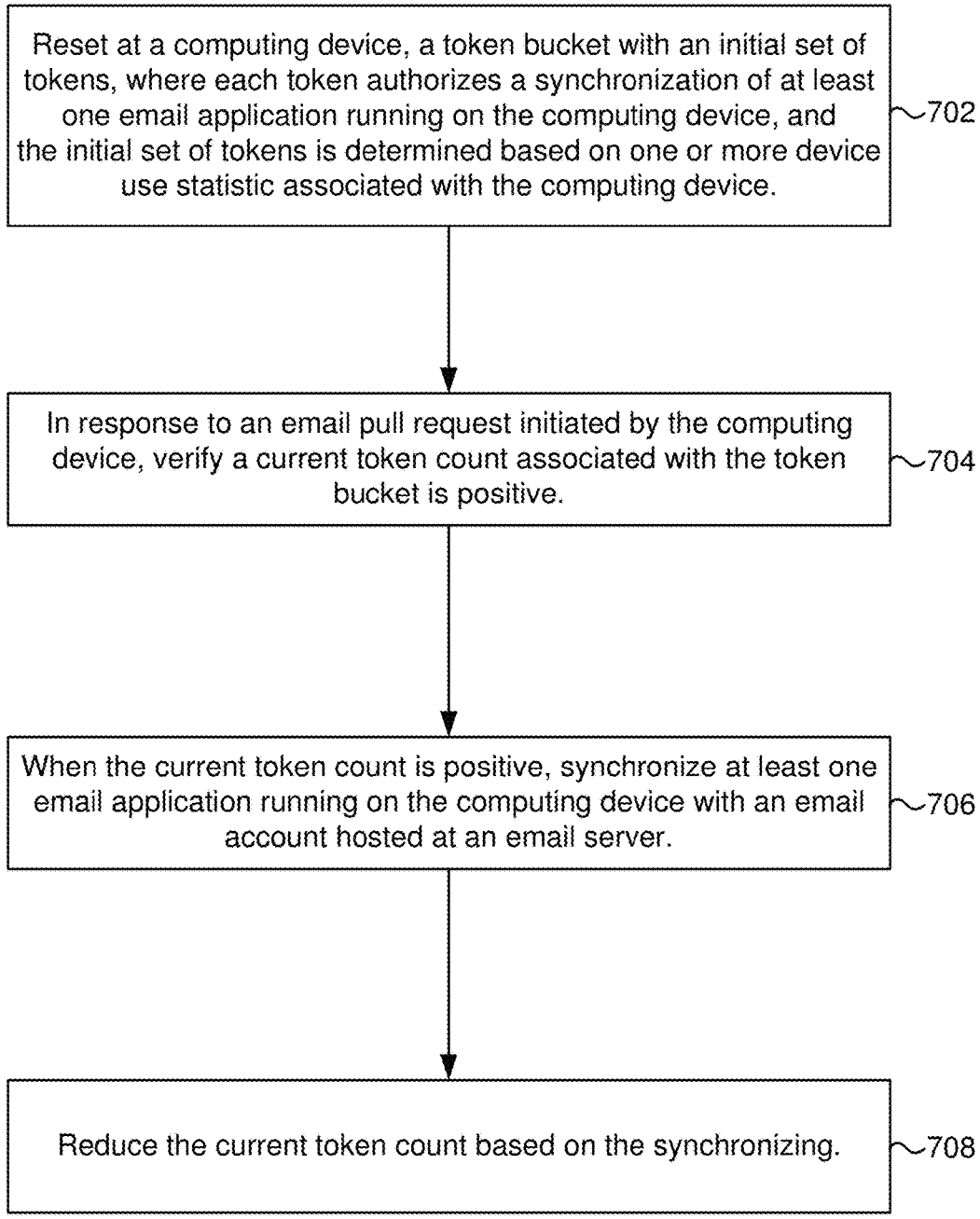
FIG. 7 is a flow diagram illustrating another example process for email synchronization using a token bucket, in accordance with an example embodiment of the disclosure.

FIG. 7 is a flow diagram illustrating another example process for email synchronization using a token bucket, in accordance with an example embodiment of the disclosure. Referring to FIGS. 1-2 and 7, the example method for email synchronization 700 may be performed by, for example, a computing device (e.g., 102) with a TBES service (e.g., 106) with a token bucket (e.g., 110). The token bucket 110 may allow for temporary storage of tokens (e.g., tokens 114 generated by token generator 108). Each token may authorize a synchronization of at least one email application (e.g., 520a) running on the computing device. The method 700 may start at 702, when the token bucket 110 may be reset with an initial set of tokens (e.g., 202). The initial set of tokens may be determined based on one or more device use statistic (e.g., 226) associated with the computing device 102.

At 704, in response to an email pull request (e.g., 130) initiated by the computing device 102, the token consumption controller 112 (or another module within the device 102) may verify that the current token count associated with the token bucket 110 is positive (i.e., the token bucket 110 is not empty). At 706, if the current token count is positive, the TBES service 106 (or the synchronization service 107) may synchronize at least one email application (e.g., 520a) running on the computing device with an email account (e.g., 134) hosted at an email server (e.g., email synchronizations 128). At 708, the token consumption controller 112 may reduce the current token count based on the synchronizing (e.g., one token per synchronization may be deducted from the current token count).

The token generator 108 may automatically add a new token (e.g., 114) to the token bucket at periodic refill time intervals (e.g., 206). If the current token count for the token bucket 110 is equal to a maximum number of tokens associated with a current size (e.g., 204) of the token bucket, the automatic adding of tokens may be suspended. The periodic refill time intervals 206 may be varied based on, for example, one or more of the following: remaining battery power, current battery discharge rate, percent of available battery, received cellular signal strength, currently active charging status, and currently active Wi-Fi connection associated with the computing device 102.

The one or more device use statistic 226 may include at least one of frequency of user interaction with the computing device, a number of received emails during a time period, a number of times a screen of the computing device is turned on, and/or geo-location of the computing device. Geo-location of the device may be used to determine whether the user is at a home or work location, associating such location with a known pattern of email use and email synchronizations (e.g., number of received emails at each location, a number of times the device is activated at each location, and so forth).

If the current token count in the token bucket 110 is equal to zero (i.e., the token bucket is empty), the email synchronization based on the email pull request may be suspended. The token consumption controller 112 (or another module within the device 102) may determine if a new token is deposited in the token bucket 110. If a new token is deposited in the token bucket 110, email synchronization using the TBES service 106 may be resumed, using the email pull request (e.g., 130).

The at least one email application (e.g., 520a) may be associated with one or more user email accounts (e.g., one or more of 134, . . . , 135). The token bucket 110 may be shared for synchronizing emails associated with the plurality of email accounts (i.e., the token bucket 110 may be shared between the email accounts 134, . . . , 135). The token bucket 110 may also be shared between multiple devices (i.e., a user may use email clients on each device to manage one or more user email accounts). In this regard, when one of the user devices is turned ON to check one of the user email accounts, the remaining user email accounts may each get a "free" token deposited in the shared token bucket, allowing for email sync of each of the remaining user email accounts.

The token generator 108 may deposit a new token (e.g., 114) in the token bucket 110, if the email pull request is initiated by a user of the computing device 102 (i.e., a "free" token is deposited in the token bucket 110 if the user activates the device 102 and requests an email synchronization). The at least one email application (e.g., 520a) running on the computing device may be synchronized with the email account (one or more of 134, . . . , 135) hosted at the email server 104 based at least on the new deposited token (i.e., the newly deposited "free" token may be used to perform email synchronization).

Figure 8:
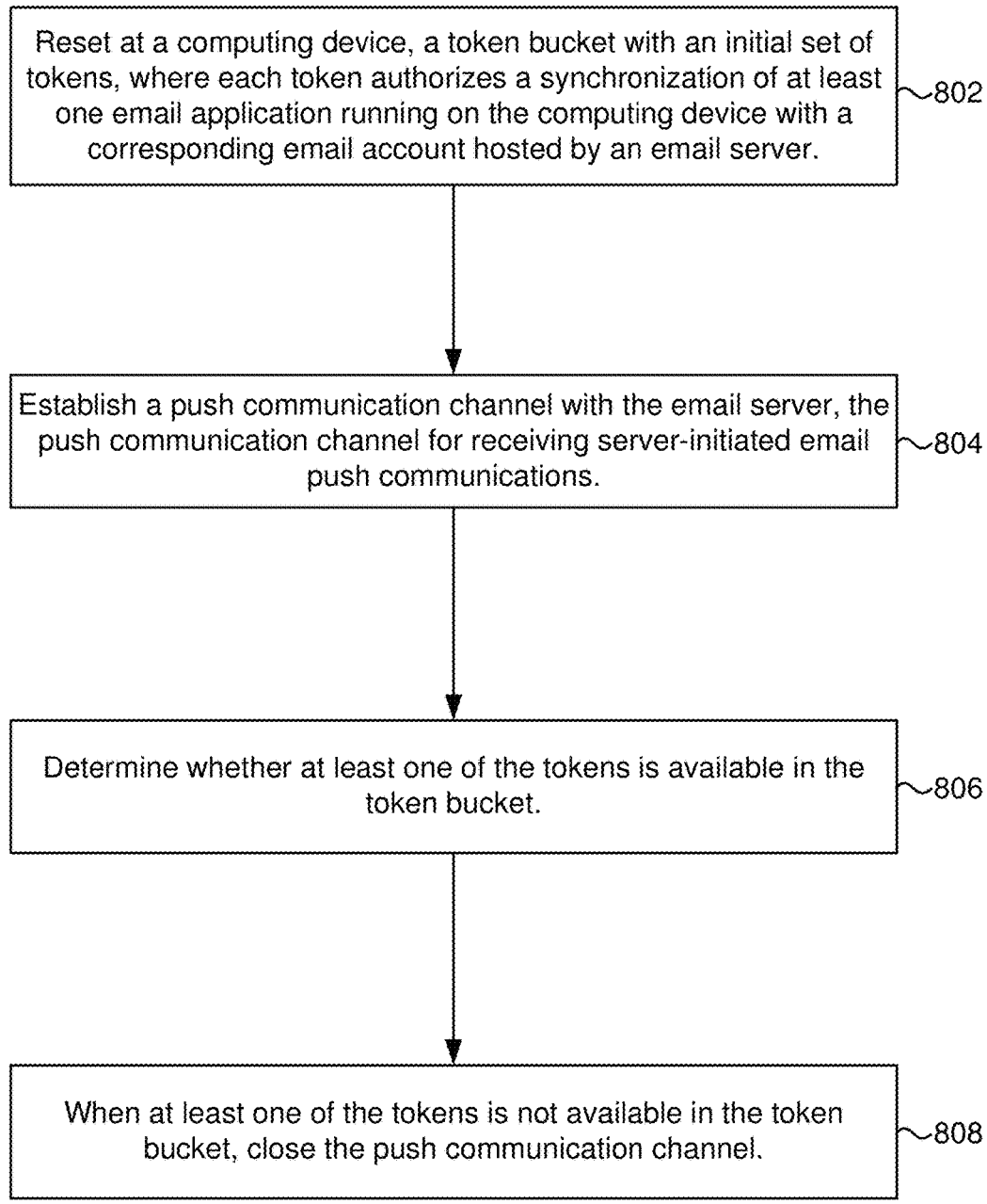
FIG. 8 is a flow diagram illustrating yet another example process for email synchronization using a token bucket, in accordance with an example embodiment of the disclosure.

FIG. 8 is a flow diagram illustrating yet another example process for email synchronization using a token bucket, in accordance with an example embodiment of the disclosure. Referring to FIGS. 1-2 and 8, the example method for email synchronization 800 may be performed by, for example, a computing device (e.g., 102) with a synchronization service (e.g., 107) and a TBES service (e.g., 106) with a token bucket (e.g., 110). The token bucket 110 may allow for temporary storage of tokens (e.g., tokens 114 generated by token generator 108). Each token may authorize a synchronization of at least one email application (e.g., 520a) running on the computing device with a corresponding email account (one or more of 134, . . . , 135) hosted by an email server (104). The synchronization service 107 may be configured to perform a method (800) for email synchronization. The method 800 may start at 802, when the token bucket 110 may be reset with an initial set of tokens, where each token in the token bucket may authorize a synchronization of the at least one email application 520a running on the computing device 102.

At 804, a push communication channel (e.g., 132) with the email server 104 may be established, the push communication channel 132 configured for receiving server-initiated email push communications (e.g., push communications initiated by server 104). At 806, the token consumption controller 112 (or another module within the device 102) may determine whether at least one of the tokens is available in the token bucket 110. If at least one of the tokens is not available in the token bucket 110, the push communication channel 132 may be closed (e.g., by using the ECC control signal 136). If at least one of the tokens is available in the token bucket 110, the at least one email application 520a may be synchronized with the corresponding email account (e.g., one or more of 134, . . . , 135) by receiving push email communications (e.g., 128) using the push communication channel 132. If the push communication channel 132 is closed, the token consumption controller 112 (or another module within the device 102) may detect if at least another one of the tokens is available in the token bucket (i.e., may detect when a new token is deposited and the token bucket 110 is no longer empty). If at least another one of the tokens is available in the token bucket, the push communication channel 132 with the email server may be re-opened/re-established.

In an example embodiment, a notification service, such as the Windows Push Notification Service (WNS), may be used in connection with the token bucket functionalities disclosed herein for purposes of receiving notifications (e.g., by the computing device 102) of a change on the server (e.g., new email received at the email server 104). More specifically, for a token bucket implementation using WNS, the sync service 107 may perform a device-initiated pull type synchronization to the server 104 when a WNS notification is received. If the token bucket 110 is empty, the sync service 107 can unregister from WNS to stop receiving notifications. Once a token is deposited in the token bucket 107, the sync service 107 can re-register for those notifications.

Figure 9:
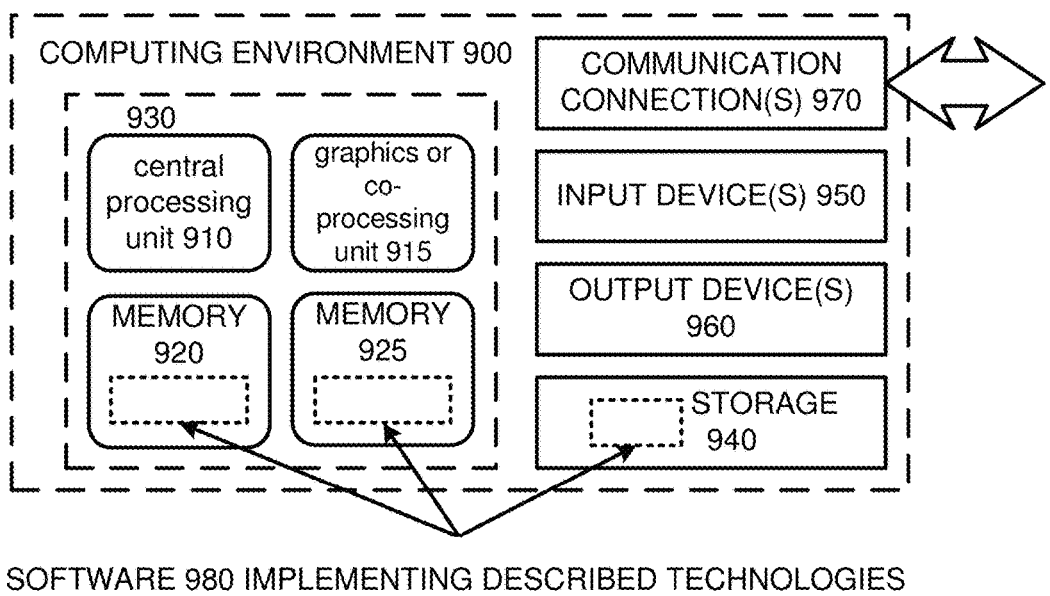
FIG. 9 is a diagram of an example computing system, in which some described embodiments can be implemented.

FIG. 9 is a diagram of an example computing system, in which some described embodiments can be implemented. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

A computing system may also have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, CD-ROMs, DVDs, or any other medium which can be used to store information and which can be accessed within the computing system 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Figure 10:
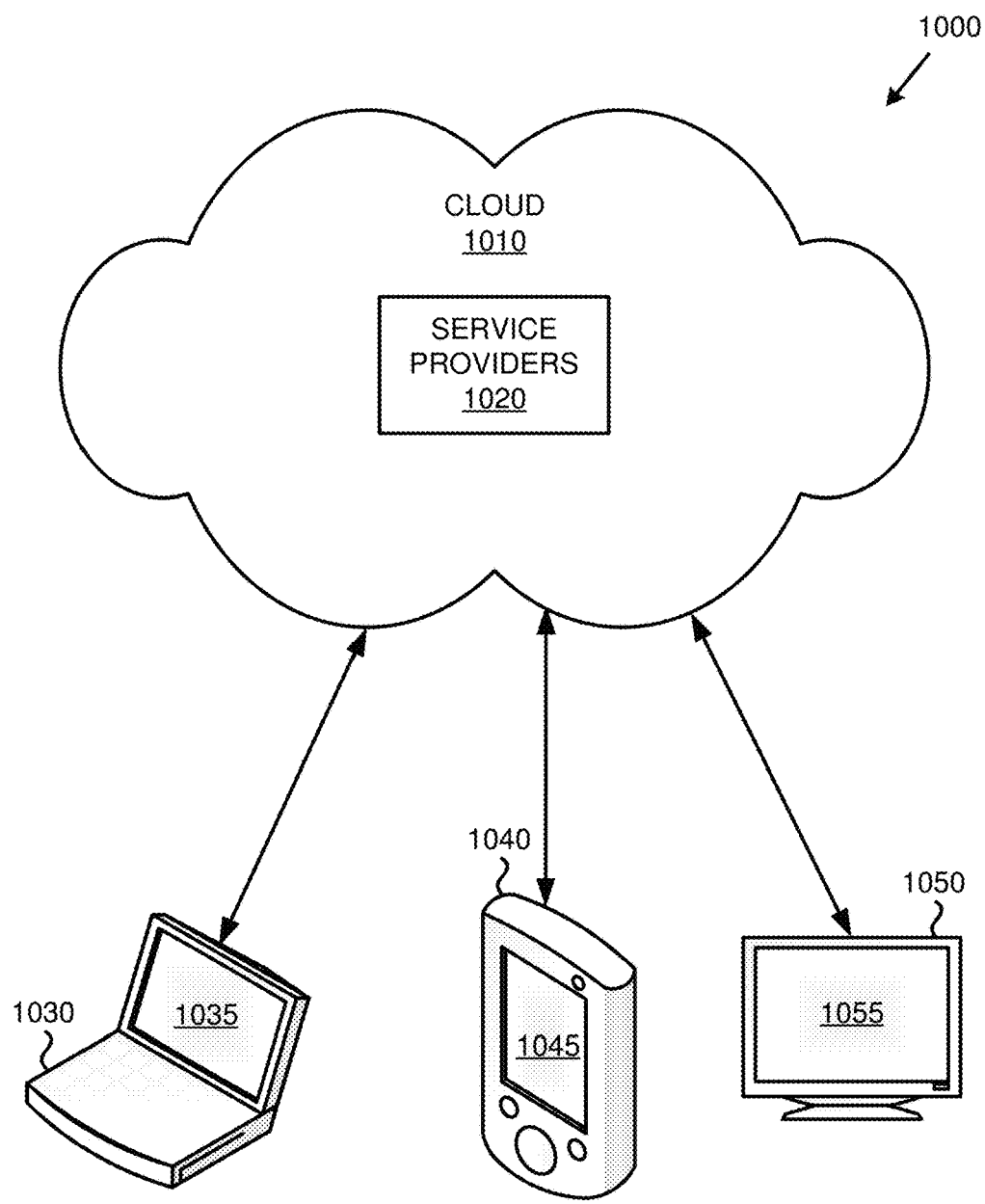
FIG. 10 illustrates a generalized example of a suitable cloud-supported environment, in which described embodiments, techniques, and technologies may be implemented.

FIG. 10 illustrates a generalized example of a suitable cloud-supported environment 1000, in which described embodiments, techniques, and technologies may be implemented. In the example environment 1000, various types of services (e.g., computing services) are provided by a cloud 1010. For example, the cloud 1010 can comprise a collection of computing devices, which may be located centrally or distributed, that provide cloud-based services to various types of users and devices connected via a network such as the Internet. The implementation environment 1000 can be used in different ways to accomplish computing tasks. For example, some tasks (e.g., processing user input and presenting a user interface) can be performed on local computing devices (e.g., connected devices 1030, 1040, 1050), while other tasks (e.g., storage of data to be used in subsequent processing) can be performed in the cloud 1010.

In example environment 1000, the cloud 1010 provides services for connected devices 1030, 1040, 1050 with a variety of screen capabilities. Connected device 1030 represents a device with a computer screen 1035 (e.g., a mid-size screen). For example, connected device 1030 could be a personal computer such as desktop computer, laptop, notebook, netbook, or the like. Connected device 1040 represents a device with a mobile device screen 1045 (e.g., a small size screen). For example, connected device 1040 could be a mobile phone, smart phone, personal digital assistant, tablet computer, and the like. Connected device 1050 represents a device with a large screen 1055. For example, connected device 1050 could be a television screen (e.g., a smart television) or another device connected to a television (e.g., a set-top box or gaming console) or the like.

One or more of the connected devices 1030, 1040, and/or 1050 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touchscreen capability of a particular connected device (e.g., connected devices 1030, 1040, and/or 1050).

In the example environment 1000, the cloud 1010 provides one or more of the technologies and solutions described herein to the various connected devices 1030, 1040, and/or 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Figure 11:
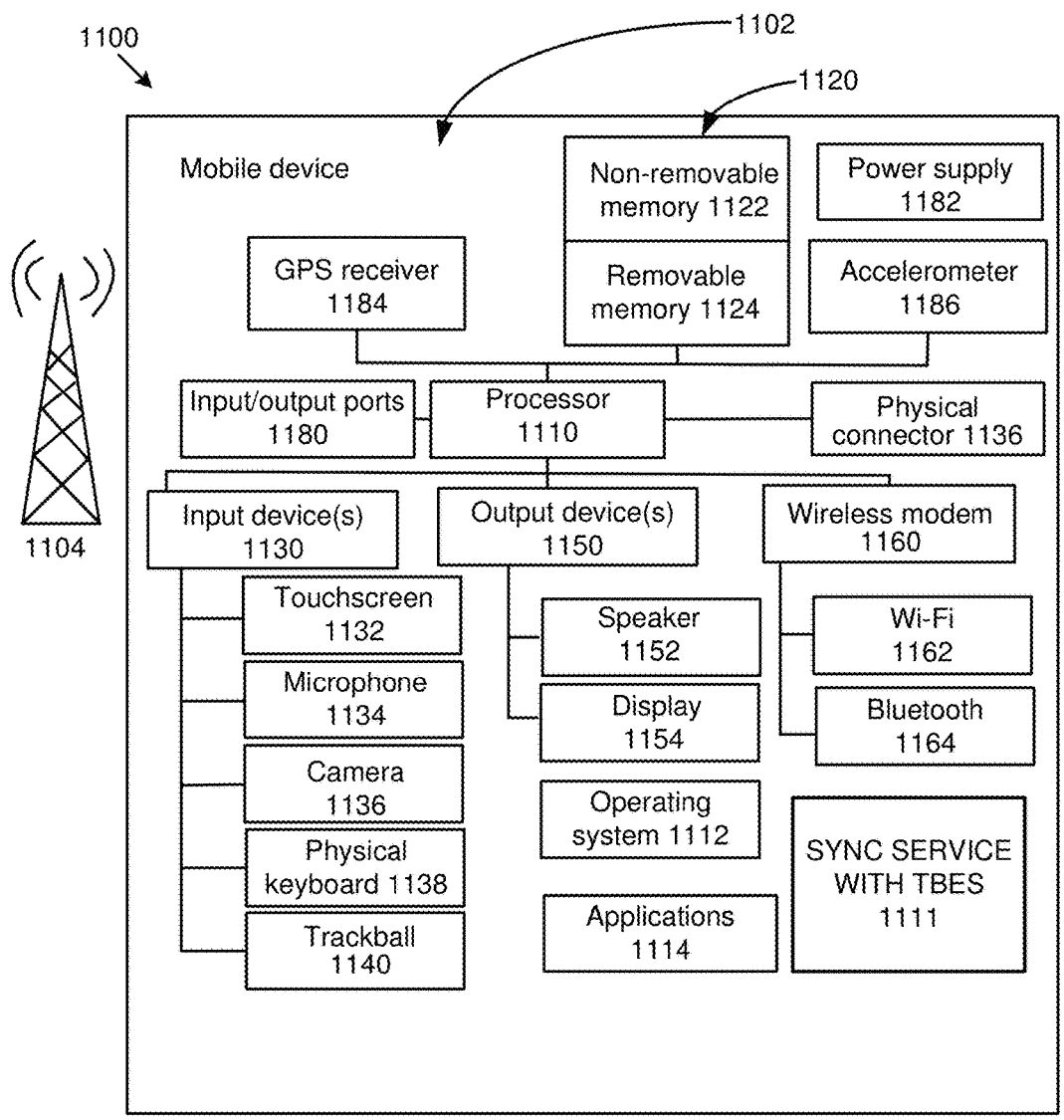
FIG. 11 is an example mobile device that can be used in conjunction with the technologies described herein.

FIG. 11 is an example mobile device that can be used in conjunction with the technologies described herein. Referring to FIG. 11, the example mobile device 1100 may include a variety of optional hardware and software components, shown generally at 1102. Any components 1102 in the mobile device 1100 can communicate with any other component, although not all connections are shown, for ease of illustration. The mobile device 1100 can be any of a variety of computing devices (e.g., cell phone, smartphone, handheld computer, Personal Digital Assistant (PDA), etc.) and can allow wireless two-way communications with one or more mobile communications networks 1104, such as a cellular, satellite, or other network.

The illustrated mobile device 1100 can include a controller or processor 1110 (e.g., signal processor, microprocessor, ASIC, or other control and processing logic circuitry) for performing such tasks as signal coding, data processing, input/output processing, power control, and/or other functions. An operating system 1112 can control the allocation and usage of the components 1102 and support for one or more application programs 1114. The application programs 1114 can include common mobile computing applications (e.g., email client applications, calendars, contact managers, web browsers, messaging applications), or any other computing application.

The operating system 1112 may further implement a synchronization service with TBES 1111, as described herein (e.g., in reference to services 106 and 107 described with regard to FIGS. 1-2). Additionally, even though the synchronization service 107 and the TBES service 106 (illustrated in FIG. 11 as 1111) are described herein with regard to email synchronization, the present disclosure may not be limited in this regard. As previously mentioned, in some instances, the synchronization service 107 and the TBES service 106 may be used for performing synchronization of PIM data such as calendar entries, one or more contact entries from contact managers, web browsers bookmarks, notes, one or more messages from a messaging application, and so forth.

The illustrated mobile device 1100 can include memory 1120. Memory 1120 can include non-removable memory 1122 and/or removable memory 1124. The non-removable memory 1122 can include RAM, ROM, flash memory, a hard disk, or other well-known memory storage technologies. The removable memory 1124 can include flash memory or a Subscriber Identity Module (SIM) card, which is well known in GSM communication systems, or other well-known memory storage technologies, such as "smart cards." The memory 1120 can be used for storing data and/or code for running the operating system 1112 and the applications 1114. Example data can include web pages, text, images, sound files, video data, or other data sets to be sent to and/or received from one or more network servers or other devices via one or more wired or wireless networks. The memory 1120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 1100 can support one or more input devices 1130, such as a touchscreen 1132, microphone 1134, camera 1136, physical keyboard 1138 and/or trackball 1140, and one or more output devices 1150, such as a speaker 1152 and a display 1154. Other possible output devices (not shown) can include piezoelectric or other haptic output devices. Some devices can serve more than one input/output function. For example, touchscreen 1132 and display 1154 can be combined in a single input/output device.

The input devices 1130 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 1112 or applications 1114 can comprise speech-recognition software as part of a voice user interface that allows a user to operate the device 1100 via voice commands. Further, the device 1100 can comprise input devices and software that allows for user interaction via a user's spatial gestures, such as detecting and interpreting gestures to provide input to a gaming application.

A wireless modem 1160 can be coupled to an antenna (not shown) and can support two-way communications between the processor 1110 and external devices, as is well understood in the art. The modem 1160 is shown generically and can include a cellular modem for communicating with the mobile communication network 1104 and/or other radio-based modems (e.g., Bluetooth 1164 or Wi-Fi 1162). The wireless modem 1160 is typically configured for communication with one or more cellular networks, such as a GSM network for data and voice communications within a single cellular network, between cellular networks, or between the mobile device and a public switched telephone network (PSTN).

The mobile device can further include at least one input/output port 1180, a power supply 1182, a satellite navigation system receiver 1184, such as a Global Positioning System (GPS) receiver, an accelerometer 1186, and/or a physical connector 1190, which can be a USB port, IEEE 1394 (FireWire) port, and/or RS-232 port. The illustrated components 1102 are not required or all-inclusive, as any components can be deleted and other components can be added.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 9, computer-readable storage media include memory 920 and 925, and storage 940. By way of example and with reference to FIG. 11, computer-readable storage media may include memory and storage 1120, 1122, and 1124. The term "computer-readable storage media" does not include signals and carrier waves. In addition, the term "computer-readable storage media" does not include communication connections (e.g., 970, 1160, 1162, and 1164).

In accordance with an example embodiment of the disclosure, a method may use a computing device with a token bucket. The token bucket may allow for temporary storage of tokens, each token authorizing a synchronization of at least one email application running on the computing device. A request for synchronizing the at least one email application with a corresponding email account may be received at the computing device. The device may determine whether at least one of the tokens is available in the token bucket. If the at least one of the tokens is available in the token bucket, the at least one email application may be synchronized with the corresponding email account. If the token bucket is empty, synchronizing the at least one email application with the corresponding email account may be suspended.

In accordance with another example embodiment of the disclosure, a computer-readable storage medium may have stored thereon computer-executable instructions operable to cause a computing device to perform a method for email synchronization. The method may include resetting at the computing device, a token bucket with an initial set of tokens. Each token may authorize a synchronization of at least one email application running on the computing device. The initial set of tokens may be determined based on one or more device use statistic associated with the computing device. In response to an email pull request initiated by the computing device, a current token count associated with the token bucket may be verified that it is positive. If the current token count is positive, at least one email application running on the computing device may be synchronized with an email account hosted at an email server. The current token count may then be reduced based on the synchronizing.

In accordance with yet another example embodiment of the disclosure, a mobile computing device may include a processor, a memory, a display, and a synchronization service with a token bucket. The token bucket may allow for temporary storage of tokens, each token authorizing a synchronization of at least one email application running on the computing device. The synchronization service may be configured to perform operations for email synchronization, including resetting the token bucket with an initial set of tokens. Each token may authorize a synchronization of the at least one email application running on the computing device with a corresponding email account hosted by an email server. A push communication channel may be established with the email server. The push communication channel may be used for receiving server-initiated email push communications. The synchronization service may determine whether at least one of the tokens is available in the token bucket. If at least one of the tokens is not available in the token bucket, the push communication channel may be closed.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A mobile computing device, comprising:
   a processor;
   a memory; and
   a synchronization service with a token bucket, the token bucket allowing for temporary storage of tokens, each token authorizing a synchronization of at least one email application running on the computing device, the synchronization service configured to perform operations for email synchronization, the operations comprising:
   resetting the token bucket with an initial set of tokens, wherein each token authorizes a synchronization of the at least one email application running on the computing device with a corresponding email account hosted by an email server;
   establishing a push communication channel with the email server, the push communication channel for receiving server-initiated email push communications;
   determining whether at least one of the tokens is available in the token bucket;
   if at least one of the tokens is available in the token bucket, synchronizing the at least one email application with the corresponding email account by receiving push email communications using the push communication channel; and
   when the token bucket is empty, closing the push communication channel.

2. The mobile computing device according to claim 1, the operations further comprising:
   after the push communication channel has been closed:
   detecting if one or more additional tokens have been added to the token bucket; and
   if at least one of the additional tokens is available in the token bucket, re-establishing the push communication channel with the email server.

3. The mobile computing device according to claim 1, the operations further comprising:
   deducting, for each synchronizing of the push email communications, one token from the tokens stored in the token bucket; and
   when the token bucket is empty:
   synchronizing the at least one email application with the corresponding email account using an email pull request initiated by the computing device.

4. The mobile computing device according to claim 1, wherein resetting the token bucket with an initial set of tokens is performed by selecting one or more of: an initial token count value, a token bucket size value, a token bucket refill interval value, or a refill token count value associated with the token bucket.

5. The mobile computing device according to claim 4, the operations further comprising:
   depositing a number of tokens in the token bucket periodically, at a time interval with duration equal to the token bucket refill interval value, the deposited number of tokens equal to the refill token count value.

6. The mobile computing device according to claim 4, the operations further comprising:
   receiving an input selecting one or more of: the initial token count value, the token bucket size value, the token bucket refill interval value, or the refill token count value, wherein the input is one of an automatic input or a user input.

7. The mobile computing device according to claim 4, wherein the resetting the token bucket is based on at least one of hardware characteristics of the computing device or use statistics associated with the computing device.

8. The mobile computing device according to claim 7, wherein the use statistics comprise at least one of frequency of user interaction with the computing device, a number of received emails during a time period, a number of times a screen of the computing device is turned on, or geo-location of the computing device.

9. A method for email synchronization using a token bucket, the token bucket allowing for temporary storage of tokens, each token authorizing a synchronization of at least one email application running on a computing device, the method comprising:
   resetting the token bucket with an initial set of tokens, wherein each token authorizes a synchronization of the at least one email application running on the computing device with a corresponding email account hosted by an email server;
   establishing a push communication channel with the email server, the push communication channel for receiving server-initiated email push communications;
   determining whether at least one of the tokens is available in the token bucket;
   if at least one of the tokens is available in the token bucket, synchronizing the at least one email application with the corresponding email account by receiving push email communications using the push communication channel; and
   when the token bucket is empty, closing the push communication channel.

10. The method according to claim 9, comprising:
    after the push communication channel has been closed:
    detecting if one or more additional tokens have been added to the token bucket; and if at least one of the additional tokens is available in the token bucket, re-establishing the push communication channel with the email server.

11. The method according to claim 9, comprising:
deducting, for each synchronizing of the push email communications, one token from the tokens stored in the token bucket; and
when the token bucket is empty:
synchronizing the at least one email application with the corresponding email account using an email pull request initiated by the computing device.

12. The method according to claim 9, wherein resetting the token bucket with an initial set of tokens is performed by selecting one or more of: an initial token count value, a token bucket size value, a token bucket refill interval value, or a refill token count value associated with the token bucket.

13. The method according to claim 12, comprising:
depositing a number of tokens in the token bucket periodically, at a time interval with duration equal to the token bucket refill interval value, the deposited number of tokens equal to the refill token count value.

14. The method according to claim 12, comprising:
receiving an input selecting one or more of: the initial token count value, the token bucket size value, the token bucket refill interval value, or the refill token count value, wherein the input is one of an automatic input or a user input.

15. The method according to claim 12, wherein the resetting the token bucket is based on at least one of hardware characteristics of the computing device or use statistics associated with the computing device.

16. The method according to claim 15, wherein the use statistics comprise at least one of frequency of user interaction with the computing device, a number of received emails during a time period, a number of times a screen of the computing device is turned on, or geo-location of the computing device.

17. A computer-readable storage device having stored thereon computer-executable instructions operable to cause a computing device to perform operations for email synchronization using a token bucket, the token bucket allowing for temporary storage of tokens, each token authorizing a synchronization of at least one email application running on the computing device, the operations comprising:
resetting the token bucket with an initial set of tokens, wherein each token authorizes a synchronization of the at least one email application running on the computing device with a corresponding email account hosted by an email server;
establishing a push communication channel with the email server, the push communication channel for receiving server-initiated email push communications;
determining whether at least one of the tokens is available in the token bucket;
if at least one of the tokens is available in the token bucket, synchronizing the at least one email application with the corresponding email account by receiving push email communications using the push communication channel; and
when the token bucket is empty, closing the push communication channel.

* * * * *